United States Patent
Burney et al.

(10) Patent No.: US 7,664,978 B2
(45) Date of Patent: Feb. 16, 2010

(54) MEMORY INTERFACE CIRCUITRY WITH PHASE DETECTION

(75) Inventors: Ali Burney, Fremont, CA (US); Sanjay K. Charagulla, San Jose, CA (US)

(73) Assignee: Altera Corporation, San Jose, CA (US)

( * ) Notice: Subject to any disclaimer, the term of this patent is extended or adjusted under 35 U.S.C. 154(b) by 569 days.

(21) Appl. No.: 11/488,199

(22) Filed: Jul. 17, 2006

(65) Prior Publication Data
US 2007/0240012 A1 Oct. 11, 2007

Related U.S. Application Data

(60) Provisional application No. 60/790,280, filed on Apr. 7, 2006.

(51) Int. Cl.
G06F 1/00 (2006.01)
G06F 1/04 (2006.01)
G06F 1/12 (2006.01)
G06F 13/00 (2006.01)
H04L 7/00 (2006.01)

(52) U.S. Cl. ............... 713/500; 713/400; 713/401; 713/503; 711/100

(58) Field of Classification Search .......... 713/400, 713/401, 500, 503; 711/100
See application file for complete search history.

(56) References Cited

U.S. PATENT DOCUMENTS

| | | | | |
|---|---|---|---|---|
| 6,509,762 B1 * | 1/2003 | Moss et al. | ............ | 327/12 |
| 6,570,944 B2 * | 5/2003 | Best et al. | ............ | 375/355 |
| 6,600,681 B1 * | 7/2003 | Korger et al. | ............ | 365/193 |
| 6,664,838 B1 * | 12/2003 | Talledo | ............ | 327/277 |
| 6,930,932 B2 * | 8/2005 | Rentschler | ............ | 365/193 |
| 6,985,096 B1 | 1/2006 | Sasaki et al. | | |
| 7,003,423 B1 | 2/2006 | Kabani et al. | | |
| 7,075,365 B1 | 7/2006 | Starr et al. | | |
| 7,457,174 B2 * | 11/2008 | Braun et al. | ............ | 365/193 |
| 2001/0033188 A1 | 10/2001 | Aung et al. | | |
| 2004/0076055 A1 | 4/2004 | Harrison | | |
| 2005/0047192 A1 * | 3/2005 | Matsui et al. | ............ | 365/145 |
| 2005/0104638 A1 | 5/2005 | Saeki | | |
| 2005/0278131 A1 | 12/2005 | Rifani | | |

OTHER PUBLICATIONS

"Stratix II GX Transceiver Block Overview" Stratix II GX Device Handbook, vol. 2, pp. 1-1 to 1-8, Altera Corporation, Feb. 2006.

(Continued)

*Primary Examiner*—Ji H Bae
(74) *Attorney, Agent, or Firm*—Treyz Law Group; G. Victor Treyz; Nancy Y. Ru

(57) ABSTRACT

Integrated circuits such as programmable logic device integrated circuits with memory interface circuitry are provided. The memory interface circuitry measures the timing characteristics of an associated memory during a series of dummy read operations. A multiplexer and phase detector are used to measure phase shifts of memory group clock signals compared to a system clock signal. The memory interface circuitry uses these measurements to adjust a delay-locked-loop circuit. The delay-locked-loop circuit produces a capture clock that is used to read data from the memory.

20 Claims, 9 Drawing Sheets

OTHER PUBLICATIONS

"Stratix II BX Physical Coding Sub-Layer", pp. 1-3 printed from www.altera.com on Mar. 21, 2006, Altera Corporation.

"Stratix II GX Transceiver FPGAs Physical Medium Attachment Layer", pp. 1 and 2, printed from www.altera.com on Mar. 21, 2006, Altera Corporation.

"Source Synchronous Signaling in Stratix II Devices", pp. 1 and 2, printed from www.altera.com on Mar. 21, 2006, Altera Corporation.

"Interfacing DDR & DDR@ SDRAM with Cyclone II Devices", Application Note AN-361-1.3 of Altera Corporation, pp. 1-42 (2006).

* cited by examiner

MEMORY INTERFACE CIRCUITRY WITH PHASE DETECTION

This application claims the benefit of provisional patent application No. 60/790,280, filed Apr. 7, 2006, which is hereby incorporated by reference herein in its entirety.

BACKGROUND

This invention relates to memory interface circuits for integrated circuits such as programmable logic device integrated circuits, and more particularly, to memory interface circuits with phase detectors and delay-locked loops for adjusting clock signals.

Programmable logic devices are a type of integrated circuit that can be programmed by a user to implement a desired custom logic function. In a typical scenario, a logic designer uses computer-aided design tools to design a custom logic circuit. When the design process is complete, the tools generate configuration data. The configuration data is loaded into a programmable logic device to configure the device to perform the functions of the custom logic circuit.

In a typical system, a programmable logic device integrated circuit is mounted on a circuit board with memory chips and other integrated circuits. When performing write and read operations on a memory, timing is critical. Because programmable logic devices are configured in many different ways and are installed on many different types of boards, the lengths of the traces that interconnect the programmable logic device and the memory can vary from one system to another. As a result, it is not generally possible to know in advance exactly how the data and clock paths between a programmable logic device and a memory will perform. In some systems the data and clock paths may have one set of timing characteristics, whereas in other systems the data and clock paths may have a different set of timing characteristics.

To accommodate variations in timing performance due to different systems environments, conventional programmable logic devices use numerous variable delay chain circuits to process the data and clock signals that are generated by a memory. While this approach can be satisfactory in many instances, using many variable delay chain circuits in a programmable logic device tends to consume relatively large amounts of circuit resources.

It would be desirable to be able to provide integrated circuits such as programmable logic device integrated circuits with memory interface circuitry that makes efficient use of on-chip resources.

SUMMARY

In accordance with the present invention, integrated circuits such as programmable logic device integrated circuits are provided that have memory interface circuitry. The memory interface circuitry performs timing characterization measurements on memory by performing a series of dummy read operations. During each dummy read operation, a memory group provides data signals and a corresponding clock signal. The memory interface circuitry uses a phase detector to compare the clock signal from the memory group to a system clock. After all groups have been measured in this way, an average phase-shift value is computed by a memory controller in the memory interface circuitry.

The memory controller provides the average phase-shift value to a delay-locked-loop circuit. The delay-locked-loop circuit shifts a system clock by an amount equal to the average phase shift to produce a capture clock. The capture clock is used during normal read operations. As data is read from the memory, the capture clock is used to clock the inputs of data capture registers. Data from the data capture registers is routed to processing logic on the integrated circuit via resynchronization registers.

Further features of the invention, its nature and various advantages will be more apparent from the accompanying drawings and the following detailed description of the preferred embodiments.

DETAILED DESCRIPTION

The present invention relates to integrated circuits that have memory interface circuitry that interfaces with memory such as random-access memory (RAM). The integrated circuits may be digital signal processors, microprocessors, application specific integrated circuits, or any other suitable integrated circuits. With one particularly suitable arrangement, the integrated circuits that interface with the memory are programmable logic device integrated circuits or other programmable integrated circuits that contain programmable circuitry. The programmable circuitry in such integrated circuits can be programmed using configuration data. Integrated circuits such as programmable logic devices are used in a diverse set of system environments, so these integrated circuits tend to benefit from the adjustable timing capabilities of the memory interface circuitry of the present invention.

Figure 1:
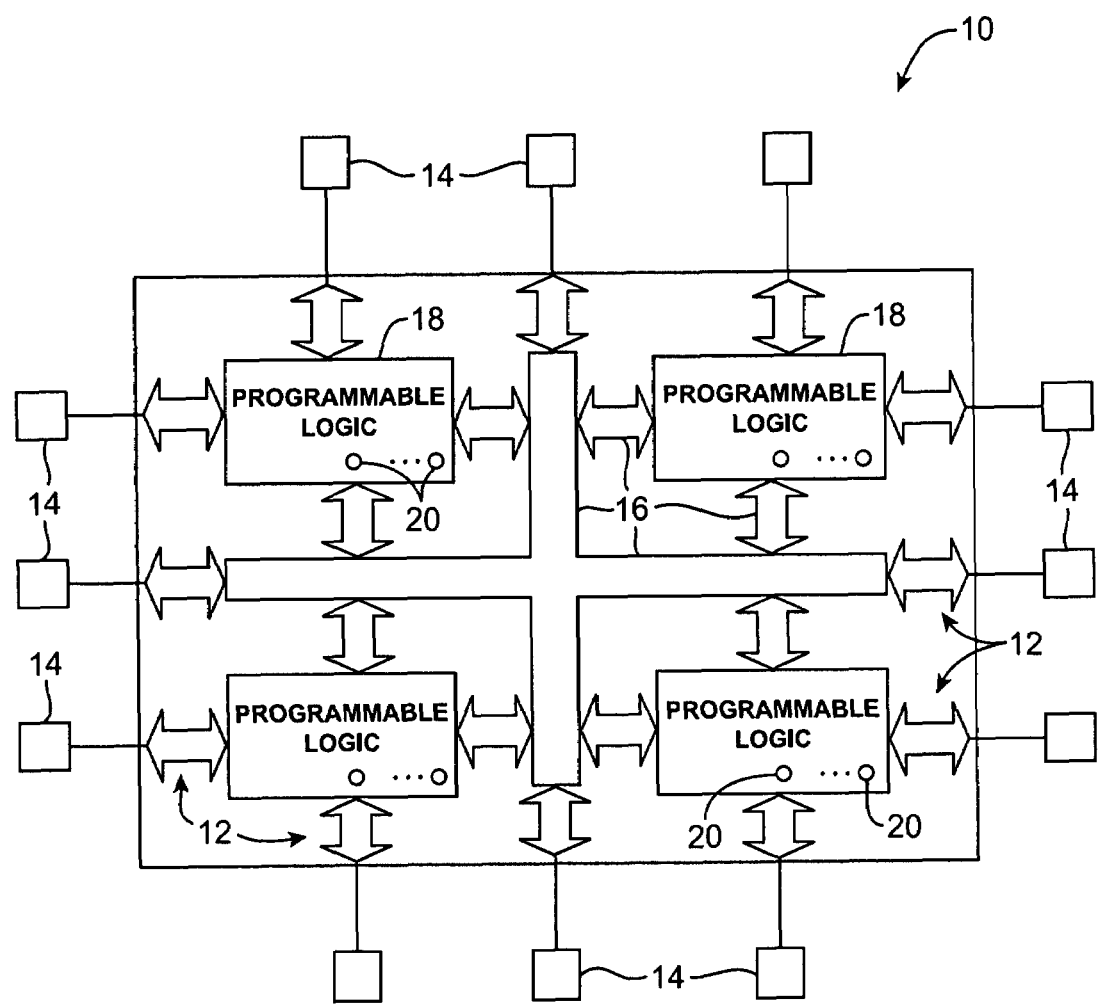
FIG. 1 is a diagram of an illustrative programmable logic device in accordance with the present invention.

An illustrative programmable logic device 10 in accordance with the present invention is shown in FIG. 1. Programmable logic device 10 may have input/output circuitry 12 for driving signals off of device 10 and for receiving signals from other devices via input/output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. For example, programmable logic 18 may include look-up tables, registers, and multiplexers. The programmable logic 18 may be configured to perform a custom logic function. The programmable interconnects associated with interconnection resources may be considered to be a part of programmable logic 18.

Programmable logic devices contain programmable elements 20. Some programmable logic devices are programmed by configuring their programmable elements 20 using mask programming arrangements. A mask-programmed device is configured during semiconductor manufacturing. Other programmable logic devices are configured after semiconductor fabrication operations have been completed (e.g., using electrical programming or laser programming to program their programmable elements). In general, programmable elements 20 may be based on any suitable programmable technology, such as fuses, antifuses, electrically-programmable read-only-memory technology, random-access memory cells, mask-programmed elements, etc.

Many programmable logic devices are electrically programmed. With electrical programming arrangements, the programmable elements 20 may be formed from memory cells. During programming, configuration data is loaded into the memory cells using pins 14 and input/output circuitry 12. The memory cells are typically random-access-memory (RAM) cells. Because the RAM cells are loaded with configuration data, they are sometimes referred to as configuration RAM cells (CRAM).

Programmable elements 20 each provide a corresponding static control output signal that controls the state of an associated logic component in programmable logic 18. The output signals are typically applied to the gates of metal-oxide-semiconductor (MOS) transistors.

The circuitry of device 10 may be organized using any suitable architecture. As an example, the logic of programmable logic device 10 may be organized in a series of rows and columns of larger programmable logic regions each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Still other device arrangements may use logic that is not arranged in rows and columns.

Figure 2:
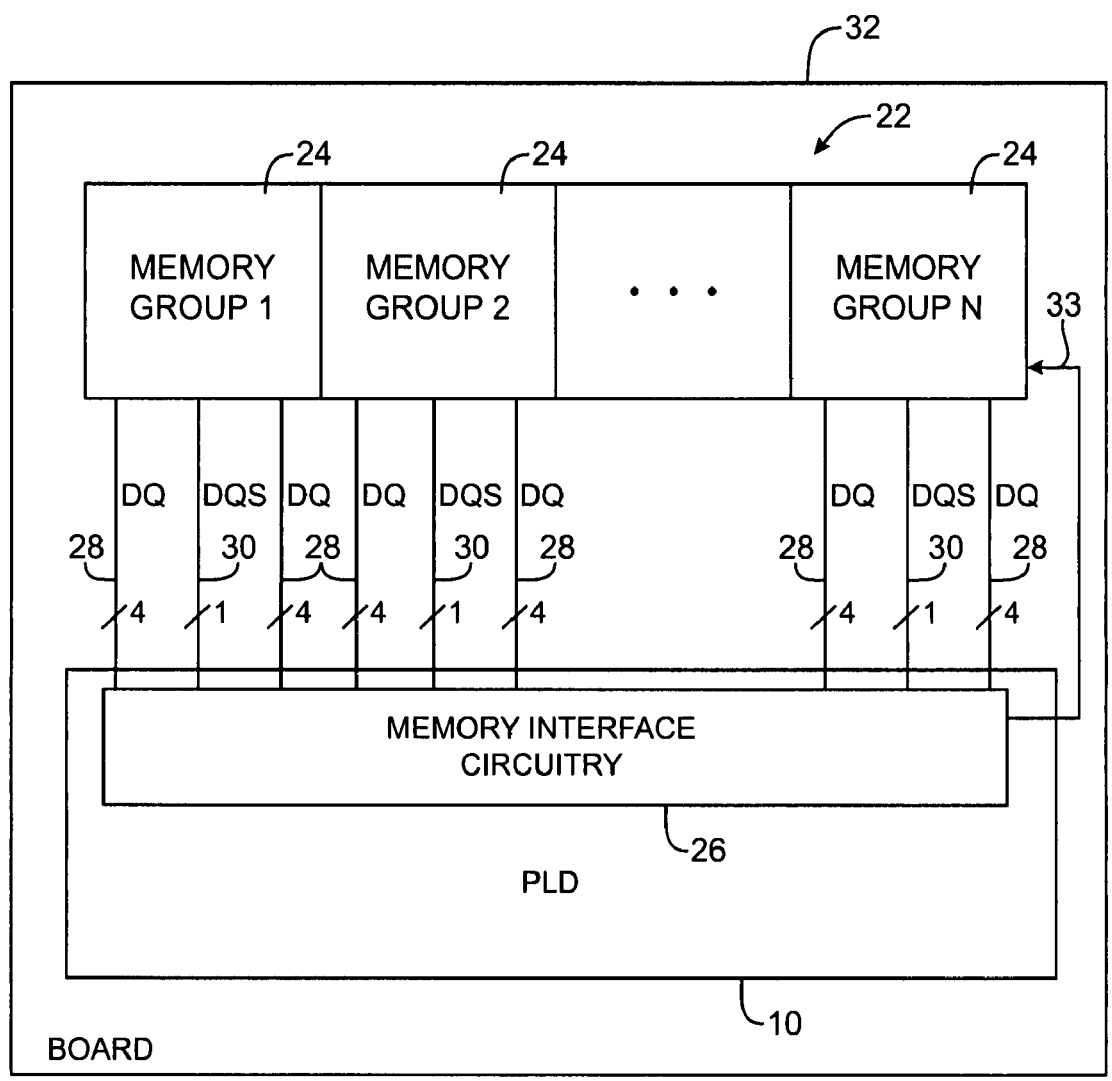
FIG. 2 is a diagram showing how a programmable logic device integrated circuit uses memory interface circuitry to interface with a memory in accordance with the present invention.

In a typical system, integrated circuits such as device 10 are mounted on a circuit board with integrated circuit memory chips and other integrated circuits. Board components are interconnected by conductive traces and packaging (i.e., sockets into which integrated circuits are mounted). An illustrative layout for a board 32 that contains a programmable logic device 10 and a memory chip 22 is shown in FIG. 2. Memory 22 and programmable logic device 10 are interconnected by conductive paths including data paths DQ and clock paths DQS.

Memory 22 may be formed from one or more integrated circuits mounted on a module. The memory 22 is organized in a series of groups 24. Each memory group 24 contains a group of memory cells (i.e., random-access memory cells). A clock line 30 and data lines 28 are associated with each memory group 24. In a typical scenario, there are eight data lines 28 and one clock line 30 associated with each memory group 24.

Data lines 28 are used to convey data between programmable logic device 10 and memory 22. During data writing operations, data is written from device 10 into memory 22 over lines 28. During data reading operations, data that was previously stored in memory 22 is read out of memory 22 and transferred to programmable logic device 10 over lines 28. When data is written into memory 22 or read out of memory 22, address and control circuitry within memory 22 must process a write or read request. Typically, a number of internal clock cycles are required to process a given write or read command. Address and control signals that are used to control write and read operations in memory 22 are provided to memory 22 via address and control path 33.

To ensure proper data capture when writing data to memory 24, programmable logic device 10 uses memory interface circuitry 26 to generate a clock signal DQS to accompany the data signals DQ. The clock signal DQS is phase-aligned with the data signals DQ, so that the memory 24 can use the clock signal DQS in capturing the data DQ as it is being written into the memory 24.

Similarly, during read operations, memory 22 generates clock signals DQS to accompany data DQ that is being transmitted to memory interface 26 of programmable logic device 10. The clock signals DQS that are generated by the memory 22 are phase aligned with their associated data signals DQ.

With a typical arrangement, a different clock signal DQS is generated for each memory group 24. For example, in the first memory group 24, a signal DQS_1 is generated that is phase aligned with the data signals DQ that are associated with the first memory group. In the second memory group 24, a signal DQS_2 is generated that is phase aligned with the data signals DQ that are associated with the second memory group.

In general, memory access operations are not synchronized with system-level data and clocks. As a result, the data signals DQ that are received from the memory are not phase aligned with any known clocks in the programmable logic device 10. It is therefore necessary to provide the DQS clocks with the DQ signals, so that the DQS clocks can be used to establish proper timing relationships when processing the DQ signals. For example, during a read operation, memory interface circuitry 26 uses the DQS clocks in capturing data as it is transmitted over paths 28 from memory 22. In general, the operation of each memory group 24 is somewhat independent, so the memory 22 generates a DQS signal for each memory group 24.

The DQS signals for the different memory groups are generally not phase aligned with each other. For example, although the DQS signal for the first memory group 24 is edge-aligned with the data signals DQ in the first memory group, the DQS signal for the first memory group and the seventh memory group (as an example) need not be in phase with each other.

Figure 3:
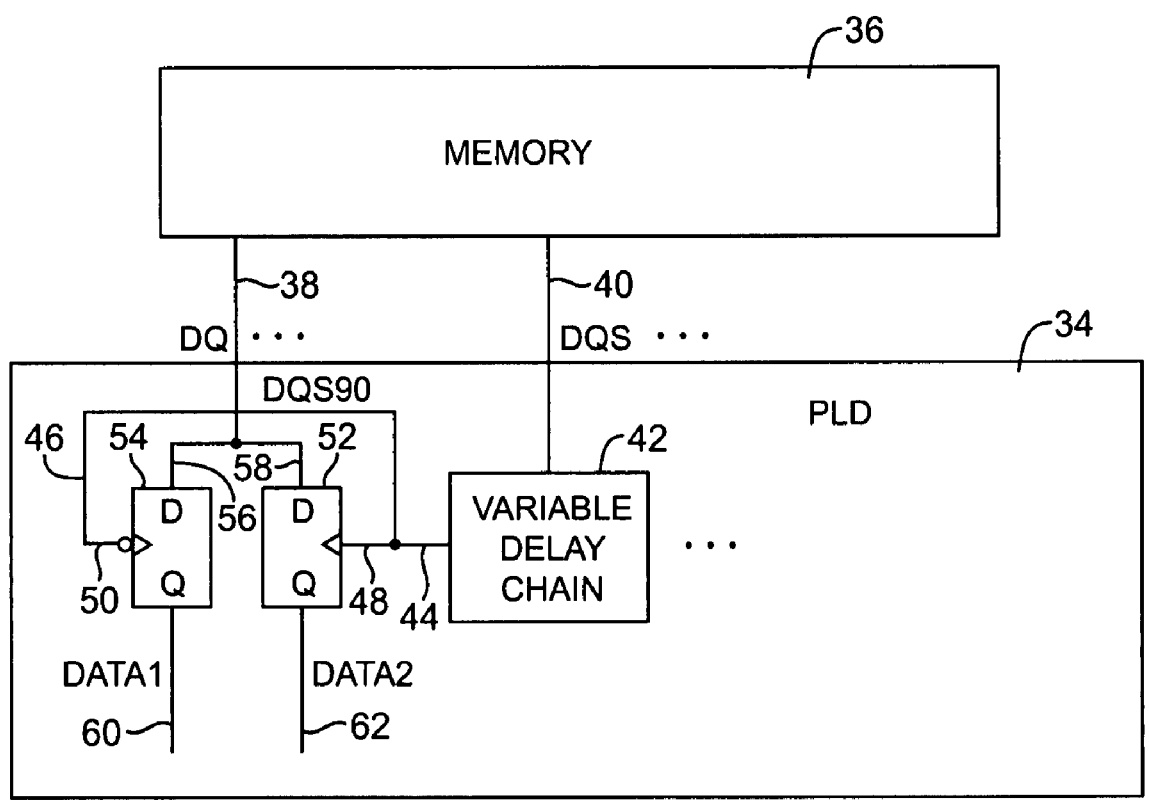
FIG. 3 is a diagram of conventional memory interface circuitry in a programmable logic device integrated circuit that interfaces with a memory chip in accordance with the present invention.

To lock onto the DQS clock signals appropriately in each memory block, conventional programmable logic device integrated circuits use variable delay chains. There is a variable delay chain associated with each memory group, so there are numerous variable delay chains on a given device. A conventional programmable logic device 34 using a variable delay chain architecture is shown in FIG. 3. As shown in FIG. 3, programmable logic device integrated circuit 34 communicates with memory 36 using DQ lines 38 and DQS lines 40.

Each DQS line is associated with a set of DQ lines. A variable delay chain 42 is used to receive each DQS signal in programmable logic device 34. The variable delay chain is adjusted by device 34 to produce a 90° phase shift in the signal DQS. The resulting phase-shifted clock signal DQS90 is produced at the output 44 of variable delay chain 42 and is routed to the non-inverting clock input 48 of register 52 and, via path 46, to the inverting clock input 50 of register 54. During data capture operations, double-date-rate signals DQ on line 38 are routed to the data inputs D of registers 54 and 52 via lines 56 and 58, respectively. The clock signals applied to the registers 54 and 52 capture the DQ data and produce corresponding data streams data1 and data2 on lines 60 and 62, respectively. Only one set of input data registers 52 and 54 is shown as being associated with the DQS signal on line 40 in FIG. 3. In general, there is a set of input data registers 52 and 54 for each separate DQ line. A variable delay chain circuit 42 that is associated with the DQS signal distributes the signal DQS90 to all of the input data registers associated with the same DQS signal (i.e., all of the input data registers associated with the same memory group).

Because conventional arrangements of the type shown in FIG. 3 require a variable delay chain for each DQS line, proper memory interface support for memories with large numbers of memory groups and DQS lines can only be provided using large numbers of variable delay chains. This tends to consume large amounts of circuit resources.

Figure 4:
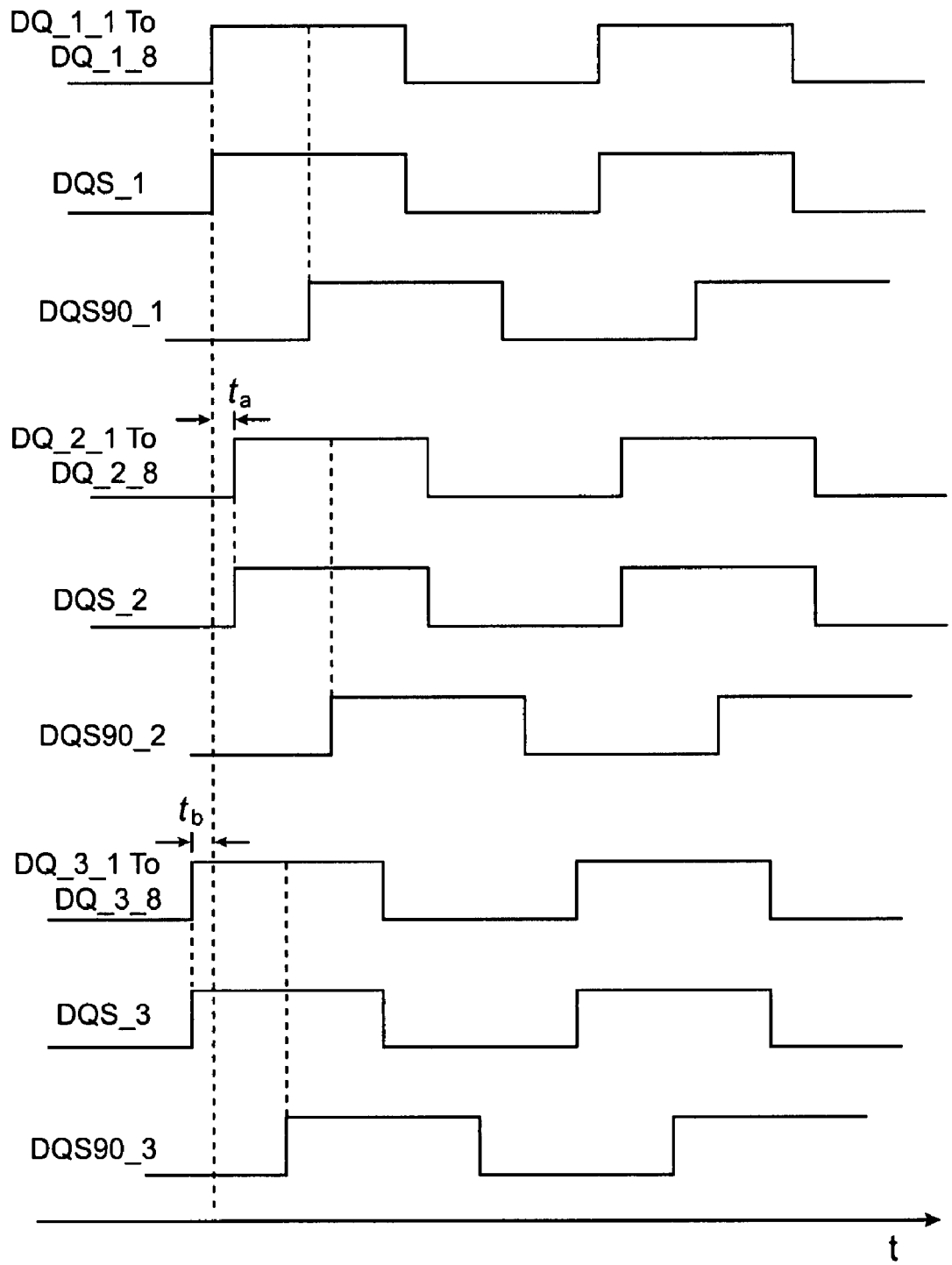
FIG. 4 is a diagram showing the relative timing of clock and data signals when a conventional programmable logic device integrated circuit of the type shown in FIG. 3 is used to interface with an integrated circuit memory.

A timing diagram illustrating the relationships between the clock and data signals associated with reading data from a memory using a conventional programmable logic device of the type shown in FIG. 3 is shown in FIG. 4. In the example of FIG. 4, the memory 36 has three memory groups. Each memory group has eight associated data signals DQ and one associated clock signal DQS. The clock signals for the three groups are DQS_1, DQS_2, and DQS_3. The eight data signals associated with the first memory group and clock signal DQS_1 are DQ_1_1, DQ_1_2, . . . DQ_1_8. The eight data signals associated with the second memory group and clock signal DQS_2 are DQ_2_1, DQ_2_2, . . . DQ_2_8. The eight data signals associated with the third memory group and clock signal DQS_3 are DQ_3_1, DQ_3_2, . . . DQ_3_8.

As shown in FIG. 4, the memory 36 (FIG. 3) produces data signals that are phase aligned with their associated clock. For example, data signals DQ_1_1, DQ_1_2, . . . DQ_1_8 are edge aligned with clock signal DQS_1. Similarly, data signals DQ_2_1, DQ_2_2, . . . DQ_2_8 are edge aligned with clock signal DQS_2 and data signals DQ_3_1, DQ_3_2, . . . DQ_3_8 are edge aligned with clock signal DQS_3.

Due to path differences such as path length differences in the conductive traces and packaging that connect memory 36 with programmable logic device integrated circuit 34, the clocks and data for the different memory groups are not phase aligned. As shown in FIG. 4, the signals in the second memory group are shifted in time by a time $t_a$ with respect to the signals in the first memory group. The third memory group signals are shifted in time (in the opposite direction) by a time $t_b$.

With the conventional memory interface arrangement of FIG. 3, each variable delay chain 42 produces a shift that is appropriate for shifting its clock signal DQS by 90°. The variable delay chain associated with the first memory group shifts clock signal DQS_1 by 90° to produce shifted clock signal DQS90_1. The variable delay chain associated with the second memory group shifts clock signal DQS_2 by 90° to produce shifted clock signal DQS90_2. The shifted clock signal DQS90_3 is produced by the variable delay chain for the third memory group, which shifts DSQ_3 by 90°. With these phase shifts, each shifted clock signal is positioned correctly in time to serve as an input to its associated data capture registers (i.e., their edges are located at the midpoints of the data signals DQ).

In the first memory group, data signals DQ_1_1, DQ_1_2, . . . DQ_1_8 are captured using signal DQS90_1. In the second memory group, data signals DQ_2_1, DQ_2_2, . . . DQ_2_8 are captured using signal DQS90_2. The signal DQS90_3 is used to capture the data signals DQ_3_1, DQ_3_2, . . . DQ_3_8 that are being read from the third group of memory in memory 36.

Figure 5:
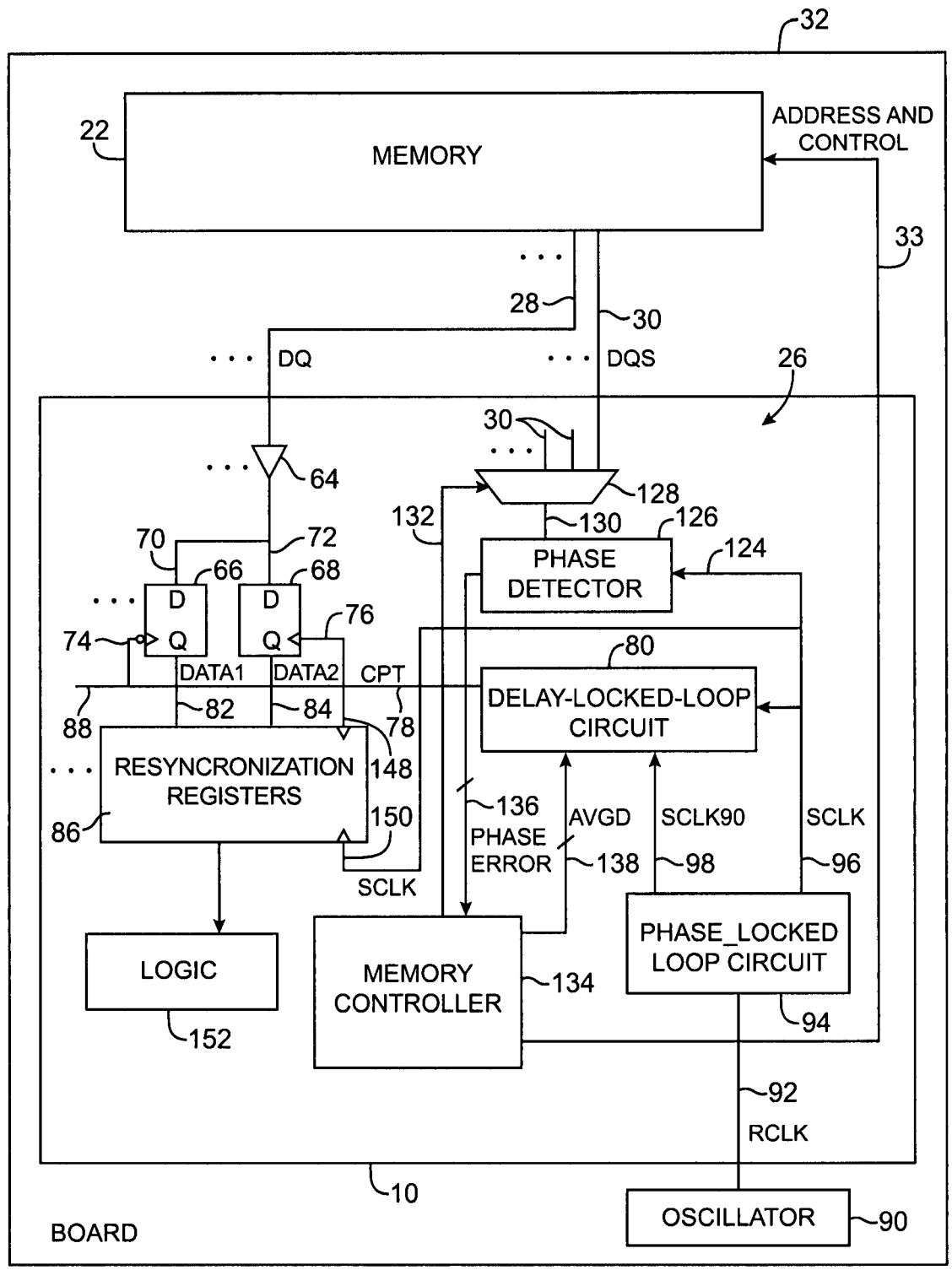
FIG. 5 is a diagram of an illustrative system in which a programmable logic device integrated circuit with memory interface circuitry interacts with a memory in accordance with the present invention.

In accordance with the present invention, a memory interface arrangement is provided that does not require a variable delay chain for processing the data signals from each group of memory. A system in accordance with the present invention is shown in FIG. 5. As shown in FIG. 5, programmable logic device 10 accesses memory 22 using data lines DQ and clock signals DQS.

During writing operations, programmable logic device integrated circuit 10 transmits data over the DQ lines that is to be stored in memory 22. At the same time, the programmable logic device 10 sends synchronized clock signals DQS, so that the memory 22 can process and store the data properly.

During memory read operations, the memory 22 retrieves stored data from appropriate memory cells and transmits this data to programmable logic device 10 over DQ data lines 28. The memory 22 also transmits in-phase clock signals DQS on associated DQS clock lines 30. There are multiple memory groups 24 in memory 22, so there are multiple DQS lines and multiple DQS signals. There are multiple DQ lines (e.g., eight) associated with each DQS signal.

Data signals on data lines 28 are routed through input buffers such as input buffer 64. Data from the input buffer 64 is routed to the data inputs D of data capture registers 66 and 68 using paths 70 and 72. There are two data capture registers associated with each data line DQ so that double-data-rate data can be captured. The data capture registers 66 and 68 capture alternate bits, because their clock inputs 74 and 76 are inverted with respect to each other.

Each clock edge of the capture clock signal CPT produced on line 78 by delay-locked-loop circuit 80 results in a data capture operation by register 66 or register 68. When the clock signal CPT has a rising clock edge, a rising clock edge is presented to non-inverting clock input 76 of register 68, causing register 68 to capture a DQ data bit via path 72. When the clock signal CPT has a falling clock edge, inverting input 74 of register 66 inverts the falling clock edge to produce a rising clock edge that causes register 66 to capture a DQ data bit via path 70. The captured data from register 66 (DATA1) is routed to resynchronization registers 86 via path 82. Captured data from register 68 (DATA2) is routed to resynchronization registers 86 via path 84.

As shown by path 88, the capture clock signal CPT is routed to the capture registers for the other DQ lines of memory 22. To ensure that the capture clock signal CPT is able to properly capture the data signals DQ associated with multiple groups of memory, the memory interface circuitry 26 generates an average capture clock. The average capture clock is not optimized for any particular data stream DQ, but rather represents a compromise capture clock that is suitable for use in capturing DQ signals from multiple different memory groups 24.

The average capture clock CPT is computed by measuring the timing characteristics associated with each DQS line 30. After measuring the timing characteristics for each DQS signal, an optimum capture clock CPT is computed and produced. The phase of the capture clock CPT is shifted by 90° with respect to the average midpoint of the data signals DQ, so the capture clock CPT can be satisfactorily used to capture data with capture registers such as capture registers 66 and 68.

In a typical system, programmable logic device 10 and memory 22 are mounted on a common system board 32. An oscillator such as oscillator 90 is used to produce a reference clock signal RCLK. The signal RCLK is routed to phase-locked-loop circuit 94 via path 92. Phase-locked-loop circuit 94 locks onto the reference clock RCLK and produces corresponding phase-locked signals SCLK and SCLK90 on output paths 96 and 98, respectively.

Figure 6:
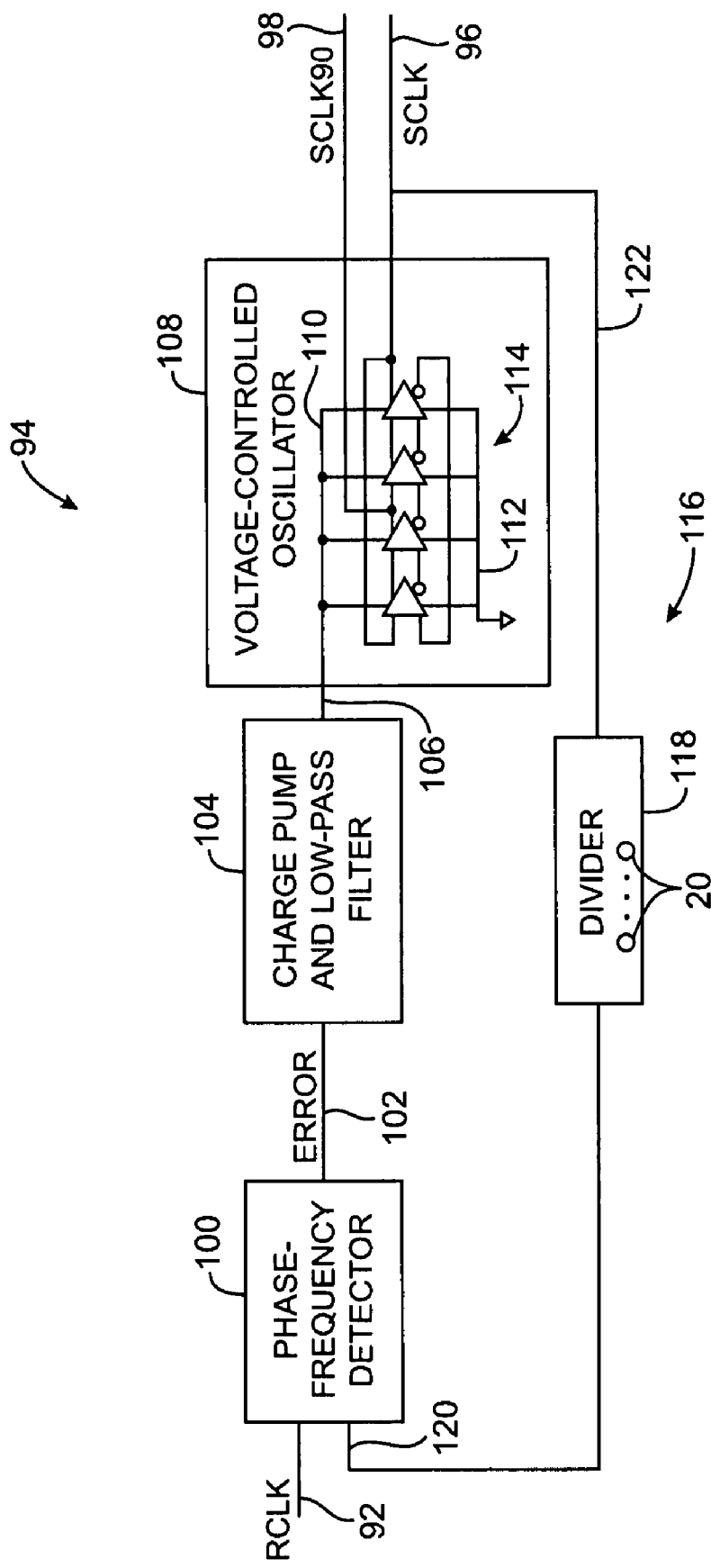
FIG. 6 is a diagram of an illustrative phase-locked-loop circuit of the type that may be used with the programmable logic device integrated circuit memory interface circuitry of FIG. 5 in accordance with the present invention.

An illustrative phase-locked-loop circuit 94 is shown in FIG. 6. As shown in FIG. 6, phase-locked-loop circuit 94 has a phase-frequency detector 100 that receives the reference clock signal RCLK at input 92. The phase-frequency detector 100 also receives a feedback signal from feedback path 116 at input 120. The phase-frequency detector 100 compares the signals on lines 92 and 120 and generates a corresponding error control signal on path 102 for charge pump and low pass filter 104. The error signal directs the charge pump circuitry 104 to generate a higher or lower voltage on its output line 106, as needed to match the phase and frequency of the feedback signal on input 120 to the reference clock RCLK on line 92.

Voltage-controlled oscillator 108 contains a ring (chain) of buffers 114. The buffers are powered using a positive power supply rail 110 that is connected to the output 106 of the charge pump 104 and a ground power supply rail 112. The frequency of the output of voltage-controlled oscillator 108 is controlled by adjusting the voltage level on line 110.

The voltage-controlled oscillator 108 produces the system clock signal SCLK at its output 96. Path 122 is used to feed back the signal SCLK from the output 96 of voltage-controlled oscillator to divider 118. Divider 118 divides the signal SCLK by an appropriate integer (e.g., by 10). Divider preferably contains programmable elements 20, so that the integer setting of the divider can be adjusted during device programming.

The amount by which divider 118 divides signal SCLK determines the ratio between the frequency of RCLK and system clock signals SCLK and SCLK90. In a typical double-data-rate memory system, divider 118 divides SCLK by 10, the reference clock RCLK has a frequency of 26.7 MHz, and the system clocks SCLK and SCLK90 operate at 267 MHz. A system clock signal such as SCLK is provided to memory 22 for use in clocking internal circuitry in memory 22. This ensures that the DQS signals and data signals DQ that memory 22 produces will be rate matched with the system clocks SCLK and SCLK90.

The frequencies of SCLK and SCLK90 are the same, but SCLK90 is obtained by using line 98 to tap into the oscillating loop in voltage controlled oscillator 108 at a different tap point than used to obtain signal SCLK. As a result, the signal SCLK90 is shifted in phase by 90° with respect to SCLK. This phase shift provides the signal SCLK90 with the proper phase alignment needed to clock the data signals DQ into the data capture registers such as registers 66 and 68.

As shown in FIG. 5, the signals SCLK90 and SCLK are provided to delay-locked-loop circuit 80. Signal SCLK is routed to input 124 of phase detector 126. Multiplexer 128 has multiple inputs and a single output. The inputs of multiplexer 128 are connected to the DQS lines 30 of respective groups of memory in memory 22. The output of multiplexer 128 is connected to phase detector 126 by path 130. Multiplexer 128 is controlled by a control signal provided over path 132 from memory controller 134. The value of the control signal on path 132 determines which of the inputs of multiplexer 128 is connected to its output. By systematically connecting each of the inputs to multiplexer 128 to its output, each of the DQS signals on lines 130 can be sampled.

Phase detector 126 compares the phase error (time shift) between the selected DQS clock signal on line 130 and the SCLK signal at input 124. The result of this comparison is provided to memory controller 134 as the signal PHASE ERROR on line 136 (e.g., as a multibit digital signal). Memory controller 134 controls the multiplexer 128, so that the phase of each DQS signal is compared to the SCLK signal. As each comparison is performed, a result is stored in memory controller 134. Memory controller 134 then computes an optimum delay time AVGD that is to be imposed on the signal SCLK90 to produce the capture clock CPT. The signal AVGD is provided to delay-locked-loop circuit 80 over path 138 (e.g., as a multibit digital signal).

Figure 7:
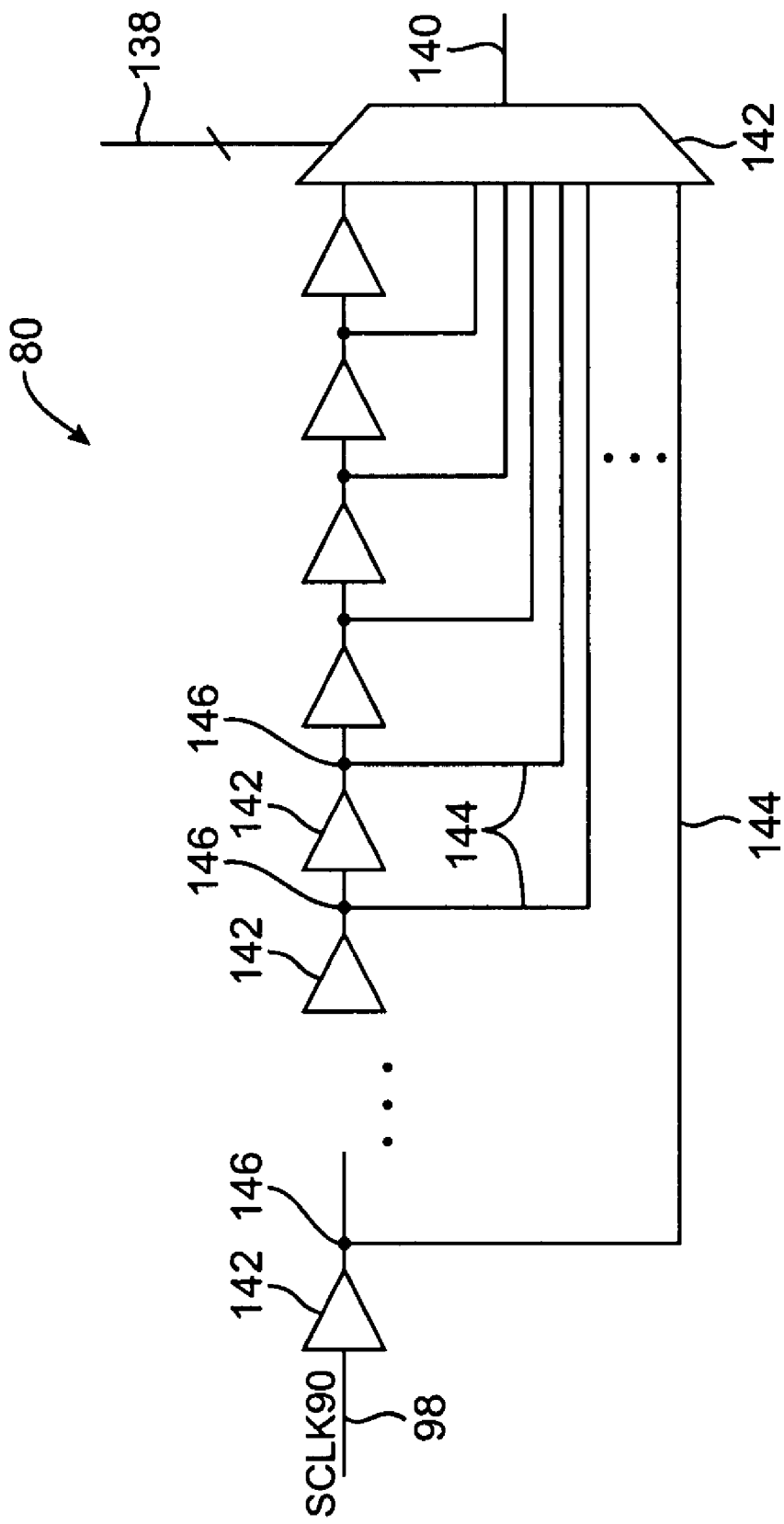
FIG. 7 is a diagram of an illustrative adjustable delay-locked-loop circuit of the type that may be used with the programmable logic device integrated circuit memory interface circuitry of FIG. 5 in accordance with the present invention.

Illustrative circuitry that may be used for delay-locked-loop circuit 80 is shown in FIG. 7. Delay-locked-loop circuit 80 has an input 98 that receives the system clock signal SCLK90 and an output 140. A chain of buffers 142 is used to create a controllable amount of delay for the signals passing between input 98 and output 140. Multiplexer 142 has multiple inputs and a single output. A control signal is applied to multiplexer 142 via control input 138. The control signal controls which of the multiplexer inputs is electrically connected to its output. The control signal may be provided in any suitable format (e.g., an eight-bit signal to provide eight bits of accuracy for adjusting the delay time of the delay-locked-loop circuit 80).

Paths 144 are connected to tap points 146 that lie between respective pairs of buffers 142. Each buffer has an associated delay time t, so by controlling the location of the tap point 146, the delay of the circuit 80 can be adjusted. If, for example, multiplexer 142 is adjusted so that there are M buffers in the path between input 98 and output 140, the delay-locked-loop circuit 80 will generate a delay of M*t.

Figure 8:
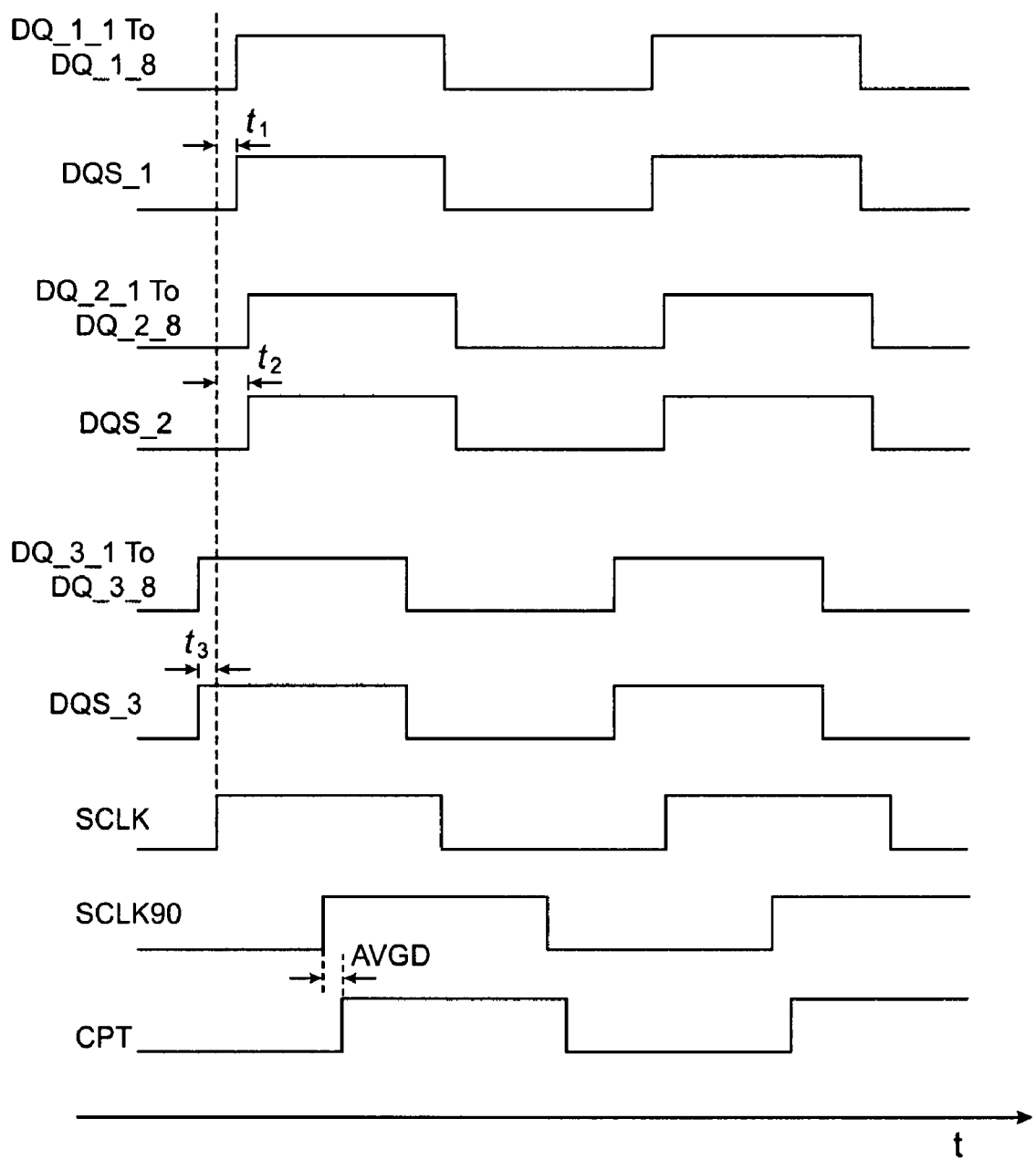
FIG. 8 is a diagram showing the relative timing between an illustrative set of data and clock signals when using memory interface circuitry in a programmable logic device integrated circuit to read data from a memory in accordance with the present invention.

A timing diagram showing the timing relationships between the clock and data signals associated with reading data from a memory using a programmable logic device of the type shown in FIG. 5 is shown in FIG. 8. In the example of FIG. 8, the memory 22 has three memory groups. Each memory group has eight associated data signals DQ and one associated clock signal DQS. The clock signals for the three groups are DQS_1, DQS_2, and DQS_3. The eight data signals associated with the first memory group and clock signal DQS_1 are DQ_1_1, DQ_1_2, . . . DQ_1_8. The eight data signals associated with the second memory group and clock signal DQS_2 are DQ_2_1, DQ_2_2, . . . DQ_2_8. The eight data signals associated with the third memory group and clock signal DQS_3 are DQ_3_1, DQ_3_2, . . . DQ_3_8.

As shown in FIG. 8, the memory 22 (FIG. 5) produces data signals that are phase aligned with their associated clock. For example, data signals DQ_1_1, DQ_1_2, . . . DQ_1_8 are edge aligned with clock signal DQS_1. Data signals DQ_2_1, DQ_2_2, . . . DQ_2_8 are in phase alignment with clock signal DQS_2 and data signals DQ_3_1, DQ_3_2, . . . DQ_3_8 are phase aligned with clock signal DQS_3.

Due to path differences such as path length differences in the conductive traces and packaging that connect memory 22 with programmable logic device integrated circuit 10, the clocks and data for the different memory groups are not phase aligned. In addition, the phase relationship between the clock signals DQS and the system clock SCLK on device 10 is not known in advance. These timing characteristics are measured by the memory interface circuitry 26 so that a satisfactory CPT signal can be generated on line 78 by delay-locked-loop circuit 80.

In the example illustrated in FIG. 8, the signals in the first, second, and third memory groups are shifted with respect with each other and with respect to system clock SCLK. To calibrate the system, memory controller 134 systematically directs multiplexer 128 to route the DQS_1, DQS_2, and DQS_3 signals into phase detector 126. In turn, phase detector 126 measures the phase difference between each of these clock signals and the system clock SCLK As shown in FIG. 8, the signal DQS_1 differs from the system clock SCLK by a time $t_1$, the signal DQS_2 is shifted by a time $t_2$ with respect to SCLK, and the signal DQS_3 and SCLK differ by a time shift of $t_3$. These time differences (which are sometimes referred to as phase errors) are measured by the memory controller 134 and averaged to produce an average time shift AVGD.

Phase-locked-loop circuit produces the signal SCLK90, which is shifted by 90° in phase with respect to the system clock SCLK, as shown in the second to last trace of FIG. 8. The delay-locked-loop circuit shifts the signal SCLK90 by the time AVGD to produce the capture clock CPT, as shown in the last trace of FIG. 8. The capture clock CPT has its rising and falling edges aligned with the average midpoints of the data signals DQ_1_1, DQ_1_2, . . . DQ_1_8, DQ_2_1, DQ_2_2, . . . DQ_2_8, and DQ_3_1, DQ_3_2, . . . DQ_3_8, so that these data signals can be properly captured in their data capture registers using the capture clock signal CPT. The captured data is provided to resynchronization registers 86, via paths such as paths 82 and 84 (FIG. 5).

Resynchronization registers 86 use a first-in-first-out arrangement. Data is written into resynchronization registers 86 using capture clock signal CPT as a write clock applied to write clock input 148, as shown in FIG. 5. Data is read from resynchronization registers 86 using the system clock SCLK as a read clock applied to read clock input 150. Data that has been read from registers 86 is provided to logic circuitry 152 on device 10 for further processing.

Figure 9:
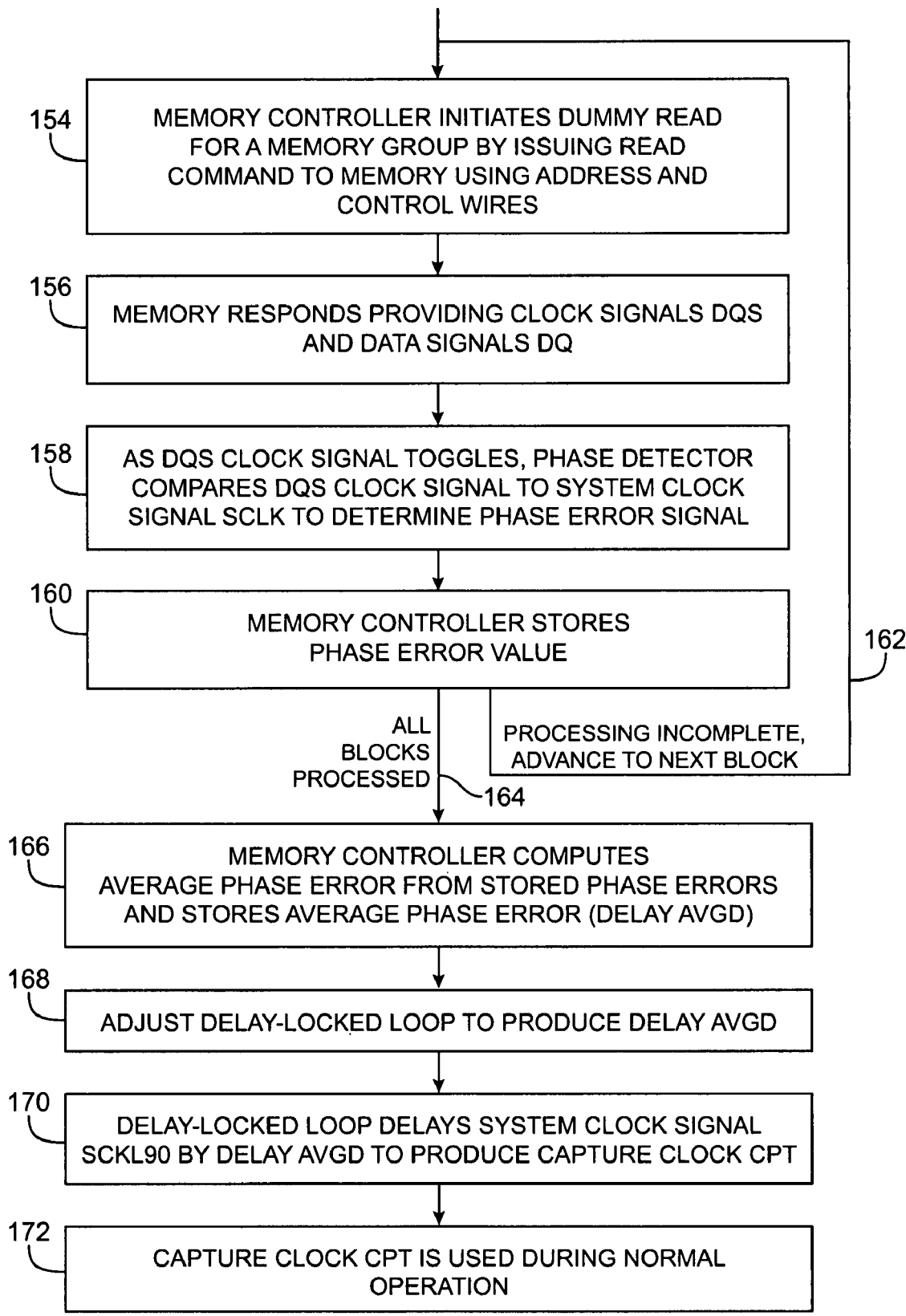
FIG. 9 is a flow chart of illustrative steps involved in setting up and using a programmable logic device integrated circuit memory interface of the type shown in FIG. 5 in accordance with the present invention.

Illustrative steps involved in using memory interface circuitry 26 of the type shown in FIG. 5 to read data from a memory are shown in FIG. 9.

Upon power-up or at another suitable time, memory controller 134 initiates a memory clock calibration process for memory 22. At step 154, the memory controller 134 initiates a dummy read operation for one of the memory groups 24. The dummy read operation is initiated by issuing a read command to the memory group 24 in the memory 22 using address and control lines 33. Memory controller 134 also issues a control signal on line 132 that connects a desired input of multiplexer 128 to its output. If desired, more than one memory group may be addressed at the same time, although multiplexer 128 and phase detector 126 only make measurements on a single DQS signal at a time.

At step 156, the memory 22 responds to the read command. In responding to the read command, the memory supplies data signals DQ and clock signals DQS. The data signals DQ are ignored. The selected clock signal DQS is routed through multiplexer 128 to phase detector 126.

At step 158, while the clock signal DQS is active and is toggling up and down as shown in FIG. 8, the phase detector 126 compares the phase of the clock signal DQS to the phase of the system clock SCLK. Based on this measurement, the phase detector determines the value of the signal PHASE ERROR and supplies this value to memory controller 134 via path 136. In the example shown in FIG. 8, the signal PHASE ERROR for the signal DQS_2 is $t_2$, because the time $t_2$ represents the phase difference between system clock signal SCLK and the memory clock signal DQS_2. In general, time or phase differences between clock signals can be represented using any suitable format (e.g., phase and time differences can be represented in degrees, in seconds, in fractions of a clock cycle, etc.).

At step 160, the memory controller 134 receives the signal PHASE ERROR and stores this value. The stored value may be stored in any suitable volatile or nonvolatile memory accessible to memory controller 134.

If there are still additional memory groups 24 that have not had their associated DQS signals measured, processing loops back to step 154 so that the next DQS signal can be measured, as indicated by line 162. If all DQS signals have been measured, processing proceeds to step 166, as indicated by line 164.

At step 166, the memory controller 134 computes the average AVGD of the stored PHASE ERROR signals. This value is stored by memory controller 134.

At step 168, the memory controller adjusts the delay-locked-loop circuit 80 by supplying the signal AVGD to the delay-locked-loop circuit 80 as a control signal via path 138.

At step 170, the delay-locked-loop circuit 80 responds to the control signal AVGD, by shifting the signal SCLK90 by the amount AVGD, as described in connection with FIG. 8. The signal SCLK90 that has been shifted by AVGD is provided to path 78 at the output of delay-locked-loop circuit 80 as capture clock signal CPT.

At step 172, the capture clock CPT that has been generated is used during normal memory read operations. As data is read from memory 22, the capture clock CPT is applied to the clock inputs of data capture registers such as registers 66 and 68 and is applied to the write clock input of resynchronization registers 86. Data that is read from memory is used by logic 152.

The foregoing is merely illustrative of the principles of this invention and various modifications can be made by those skilled in the art without departing from the scope and spirit of the invention.

What is claimed is:

1. A programmable logic device connected to a memory that produces a plurality of memory clock signals and a plurality of corresponding memory data signals during read operations, the programmable logic device comprising:
   circuitry that processes each of the memory clock signals to determine an average amount to delay a system clock signal to capture all of the memory data signals and that issues a corresponding average delay control signal;
   a delay-locked-loop circuit that receives the system clock signal, that receives the corresponding average delay control signal, and that shifts the system clock signal by the average amount to produce a capture clock; and
   data capture registers that have clock inputs that receive the capture clock and that capture all of the memory data signals from the memory.

2. The programmable logic device defined in claim 1 further comprising a phase-locked-loop circuit that receives and locks onto a reference clock and that supplies the system clock to the delay-locked-loop circuit.

3. The programmable logic device defined in claim 1 further comprising a phase-locked-loop circuit that receives and locks onto a reference clock and that supplies the system clock to the delay-locked-loop circuit, wherein the phase-locked-loop circuit contains a feedback path that includes a divider, wherein the divider divides signals on the feedback path by an integer amount that is established by an integer setting, and wherein the divider contains programmable elements that are loaded with configuration data to adjust the integer setting of the divider.

4. The programmable logic device defined in claim 1 wherein the circuitry that processes each of the memory clock signals to determine the average amount to delay the system clock signal comprises a phase detector that receives each of the memory clock signals.

5. The programmable logic device defined in claim 1 wherein the circuitry that processes each of the memory clock signals to determine the average amount to delay the system clock signal comprises:
   a phase-locked-loop circuit that supplies a clock;
   a multiplexer that has a plurality of inputs, each input receiving a respective one of the memory clock signals, that has a control terminal to which a control signal is applied, and that has an output to which a selected one of the plurality of inputs is routed based on the control signal; and
   a phase detector that has first and second inputs and an output, wherein the first input receives the clock from the phase-locked-loop circuit, wherein the second input receives the output of the multiplexer, and wherein the phase detector compares the first input and the second input and supplies a corresponding phase error signal to the output.

6. The programmable logic device defined in claim 1 wherein the circuitry that processes each of the memory clock signals to determine the average amount to delay the system clock signal comprises:
   a phase-locked-loop circuit that supplies a clock;
   a multiplexer that has a plurality of inputs, each input receiving a respective one of the memory clock signals, that has a control terminal to which a control signal is applied, and that has an output to which a selected one of the plurality of inputs is routed based on the control signal;
   a phase detector that has first and second inputs and an output, wherein the first input receives the clock from the phase-locked-loop circuit, wherein the second input receives the output of the multiplexer, and wherein the phase detector compares the first input and the second input and supplies a corresponding phase error signal to the output; and
   a memory controller that supplies the control signal to the control terminal of the multiplexer and that receives the phase error signal from the output of the phase detector while adjusting the control signal.

7. The programmable logic device defined in claim 1 wherein the circuitry that processes each of the memory clock signals to determine the average amount to delay the system clock signal comprises:
   a phase-locked-loop circuit that supplies a clock;
   a multiplexer that has a plurality of inputs, each input receiving a respective one of the memory clock signals, that has a control terminal to which a control signal is applied, and that has an output to which a selected one of the plurality of inputs is routed based on the control signal;
   a phase detector that has first and second inputs and an output, wherein the first input receives the clock from the phase-locked-loop circuit, wherein the second input receives the output of the multiplexer, and wherein the phase detector compares the first input and the second input and supplies a corresponding phase error signal to the output; and
   a memory controller that supplies the control signal to the control terminal of the multiplexer and that receives the phase error signal from the output of the phase detector while adjusting the control signal, wherein the memory controller produces the average delay control signal by computing the average amount based on the phase error signals from the phase detector and that has an average delay output that supplies the average delay control signal to the delay-locked-loop circuit.

8. The programmable logic device defined in claim 1 wherein the memory is organized in a plurality of memory groups, wherein during data read operations each memory group produces an associated one of the memory clock signals and an associated set of the memory data signals, and wherein the circuitry that processes each of the memory clock signals comprises:
   phase detector and memory controller circuitry that uses phase error measurements to determine how much each of the memory clock signals is shifted relative to a given clock signal and that produces the average delay control signal based on the phase error measurements, wherein the data capture registers are organized in sets, each set of data capture registers receiving the set of memory data signals associated with a corresponding one of the memory groups.

9. The programmable logic device defined in claim 1 further comprising:
   a phase-locked loop circuit that produces the system clock and an additional system clock, wherein the system clock is shifted by ninety degrees with respect to the additional system clock; and
   a phase detector that makes phase comparisons between each of the memory clock signals and the additional system clock.

10. A method of using an integrated circuit to read data from a memory that has a plurality of memory groups, each memory group having a respective memory clock signal and an associated set of memory data signals that are in phase with the memory clock signal for that memory group, comprising:
   using the integrated circuit to make a plurality of phase error measurements by comparing each of the respective memory clock signals to a system clock;
   using the integrated circuit to compute a single delay value based on each of the plurality of the phase error measurements;
   using the computed single delay value to produce a single capture clock on the integrated circuit; and
   using the single capture clock to capture the memory data signals from all of the memory groups in parallel during read operations in which the integrated circuit reads data from the memory.

11. The method defined in claim 10 wherein using the integrated circuit to make the plurality of phase error measurements by comparing each of the memory clock signals to the system clock comprises using a phase detector to measure phase shifts between each of the memory clock signals and the system clock.

12. The method defined in claim 10 wherein using the integrated circuit to make the plurality of phase error measurements by comparing each of the respective memory clock signals to the system clock comprises making phase error measurements by comparing the respective memory clock signal for each memory group to the system clock during a dummy read operation.

13. A method of using an integrated circuit to read data from a memory that has a plurality of memory groups, each memory group having an associated memory clock signal and an associated set of memory data signals that are in phase with the memory clock signal for that memory group, comprising:
  using the integrated circuit to make phase error measurements by comparing each of the memory clock signals to a system clock;
  using the integrated circuit to compute a delay value based on the phase error measurements;
  using the computed delay value to produce a capture clock on the integrated circuit; and
  using the capture clock to capture the memory data signals from all of the memory groups in parallel during read operations in which the integrated circuit reads data from the memory, wherein the integrated circuit comprises a memory controller, a phase detector, and a multiplexer, and wherein using the integrated circuit to make phase error measurements by comparing each of the memory clock signals to the system clock comprises using the memory controller to adjust the multiplexer so that each of the memory clock signals is routed from respective inputs to the multiplexer to the phase detector.

14. A method of using an integrated circuit to read data from a memory that has a plurality of memory groups, each memory group having an associated memory clock signal and an associated set of memory data signals that are in phase with the memory clock signal for that memory group, comprising:
  using the integrated circuit to make phase error measurements by comparing each of the memory clock signals to a system clock;
  using the integrated circuit to compute a delay value based on the phase error measurements;
  using the computed delay value to produce a capture clock on the integrated circuit; and
  using the capture clock to capture the memory data signals from all of the memory groups in parallel during read operations in which the integrated circuit reads data from the memory, wherein using the integrated circuit to compute the delay value based on the phase error measurements comprises computing an average delay based on each of the phase error measurements.

15. The method defined in claim 14 the method further comprising adjusting a delay-locked-loop to produce the computed average delay.

16. The method defined in claim 14 wherein the integrated circuit contains a given clock that is shifted by a non-zero phase relative to the system clock, and wherein using the computed delay value to produce the capture clock on the integrated circuit comprises using the average delay to produce the capture clock.

17. The method defined in claim 14 wherein the integrated circuit contains a delay-locked loop circuit, wherein the integrated circuit contains a given clock that is shifted by a non-zero phase relative to the system clock, and wherein using the computed delay value to produce the capture clock on the integrated circuit comprises adjusting the delay-locked loop circuit to delay the given clock by the computed average delay to produce the capture clock.

18. The method defined in claim 14 wherein the integrated circuit comprises a phase-locked-loop circuit that receives a reference clock and that produces the system clock, wherein the integrated circuit contains a delay-locked loop circuit, wherein the phase-locked-loop circuit produces a given clock that is shifted by a non-zero phase relative to the system clock, wherein the given clock is provided to the delay-locked loop circuit by the phase-locked-loop circuit, wherein the integrated circuit contains a memory controller, and wherein using the computed delay value to produce the capture clock on the integrated circuit comprises using the memory controller to adjust the delay-locked loop circuit to delay the given clock by the computed average delay to produce the capture clock.

19. The method defined in claim 14 wherein the integrated circuit comprises a phase-locked-loop circuit that receives a reference clock and that produces the system clock, wherein the integrated circuit contains a delay-locked loop circuit, wherein the phase-locked-loop circuit produces a given clock that is shifted by ninety degrees relative to the system clock, wherein the given clock is provided to the delay-locked-loop circuit by the phase-locked-loop circuit, wherein the integrated circuit contains a memory controller, wherein the integrated circuit contains a phase detector, wherein using the integrated circuit to make phase error measurements by comparing each of the memory clock signals to the system clock comprises using the phase detector to measure phase shifts between each of the memory clock signals and the system clock, and wherein using the computed delay value to produce the capture clock on the integrated circuit comprises using the memory controller to adjust the delay-locked loop circuit to delay the given clock by the computed average delay to produce the capture clock.

20. Memory interface circuitry on an integrated circuit that is connected to a memory that has a plurality of memory groups, wherein each memory group provides a respective memory clock signal over a memory clock line and a respective set of corresponding memory data signals over memory data lines, the memory interface circuitry comprising:
  a phase-locked-loop circuit that produces phase-locked-loop clock signals;
  a multiplexer having a plurality of inputs each of which is connected to a memory clock line associated with a respective one of the memory groups and that receives a corresponding memory clock signal and having an output at which a selected one of the memory clock signals is provided based on a multiplexer control signal;
  a plurality of pairs of data capture registers that receive the memory data signals, wherein each pair of data capture registers is associated with a respective one of the memory data lines and wherein the pairs of data capture registers have clock inputs;
  a delay-locked-loop circuit that receives the phase-locked-loop clock signals from the phase-locked-loop circuit and that produces a corresponding capture clock according to a delay-locked-loop circuit control signal, wherein the capture clock is provided to the clock inputs of the pairs of data capture registers;
  a phase detector that compares the selected memory clock signal at the output of the multiplexer to the phase-locked-loop clock signals and that produces a corresponding phase error signal; and
  a memory controller that provides the multiplexer control signal to the multiplexer to instruct the multiplexer to route each of the memory clock signals to the phase detector while monitoring the phase error signal produced by the phase detector corresponding to each memory clock signal, that analyzes the phase error signals, and that, based on the analyzed phase error signals, provides the delay-locked-loop circuit control signal to the delay-locked-loop circuit to adjust the delay-locked-loop circuit to produce a particular value of the capture clock.

* * * * *

UNITED STATES PATENT AND TRADEMARK OFFICE
CERTIFICATE OF CORRECTION

PATENT NO. : 7,664,978 B2
APPLICATION NO. : 11/488199
DATED : February 16, 2010
INVENTOR(S) : Burney et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 783 days.

Signed and Sealed this

Twenty-eighth Day of December, 2010

David J. Kappos
*Director of the United States Patent and Trademark Office*